(12) United States Patent
Market et al.

(10) Patent No.: US 7,739,049 B2
(45) Date of Patent: Jun. 15, 2010

(54) METHOD AND APPARATUS FOR MULTI-MODE SIGNAL PROCESSING

(75) Inventors: Jennifer Market, Spring, TX (US); Gary D. Althoff, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 906 days.

(21) Appl. No.: 10/839,785

(22) Filed: May 5, 2004

(65) Prior Publication Data
US 2005/0251342 A1 Nov. 10, 2005

(51) Int. Cl.
*G01V 1/40* (2006.01)
*G01V 1/00* (2006.01)

(52) U.S. Cl. ............................................ 702/6; 367/32

(58) Field of Classification Search ............ 702/6, 702/18, 1–2, 9, 11, 13–14, 16; 367/32, 73, 367/80, 14, 25, 27–30; 703/5, 10
See application file for complete search history.

(56) References Cited

U.S. PATENT DOCUMENTS

| | | | | |
|---|---|---|---|---|
| 4,543,648 A | * | 9/1985 | Hsu | 367/29 |
| 4,594,691 A | * | 6/1986 | Kimball et al. | 367/32 |
| 4,698,793 A | * | 10/1987 | Wu | 367/32 |
| 4,740,928 A | * | 4/1988 | Gutowski et al. | 367/27 |
| 4,819,214 A | * | 4/1989 | Gutowski et al. | 367/27 |
| 5,058,079 A | * | 10/1991 | Wright et al. | 367/59 |
| 5,278,805 A | * | 1/1994 | Kimball | 367/32 |
| 5,594,706 A | * | 1/1997 | Shenoy et al. | 367/76 |
| 6,453,240 B1 | * | 9/2002 | Blanch et al. | 702/11 |
| 6,691,036 B2 | | 2/2004 | Blanch et al. | |
| 6,766,252 B2 | * | 7/2004 | Blanch et al. | 702/6 |

OTHER PUBLICATIONS

McClellan, J., Two-Dimensional Spectrum Analysis in Sonic Logging, 1986 IEEE, pp. 3105-3111.*
Kimball, Christopher V., "Semblance Processing of Borehole Acoustic Array Data", *Geophysics*, vol. 49, No. 3, (Mar. 1984),274-281.
Paillet, Frederick L., et al., "A Numerical Investigation of head Waves and Leaky Modes in Fluid-Filled Boreholes", *Geophysics*, vol. 51, No. 7, (Jul. 1986),1438-1449.

* cited by examiner

*Primary Examiner*—Drew A Dunn
*Assistant Examiner*—Toan M Le
(74) *Attorney, Agent, or Firm*—Schwegman, Lundberg & Woessner, P.A.

(57) ABSTRACT

A method is disclosed that may include separating modes in a plurality of coherent time-domain signals to form a plurality of separated modes, generating frequency coherence information for each of the plurality of separated modes, and combining the frequency coherence information for each of the plurality of separated modes to form combined frequency coherence information. An apparatus and system may include a processor and a storage device that can be encoded with computer-readable instructions, wherein the instructions when read and executed by the processor may include activities such as separating modes in a plurality of coherent time-domain signals, and recombining the modes in a frequency domain.

25 Claims, 10 Drawing Sheets

METHOD AND APPARATUS FOR MULTI-MODE SIGNAL PROCESSING

FIELD

The subject matter relates to signal processing. More particularly, the subject matter relates to signal processing in the time and frequency domains.

BACKGROUND

Several problems exist in current frequency coherence signal processing apparatus and methods. First, at a particular frequency, multiple modes are sometimes indistinguishable from one another. The mode with the strongest frequency coherence can dominate the modes having weaker frequency coherence, such that the modes having weaker frequency coherence do not appear in the frequency coherence information or plots. A frequency coherence plot of such "masked" modes includes discontinuities. The modes appear to jump between frequencies. In addition, modes that are close together in slowness are blurred together and appear as a single mode.

One approach suggested for solving these problems in downhole measurement systems involves energy matching between receivers. Unfortunately, this solution is not feasible for use in logging-while-drilling tools. Even when used in wireline tools, such approaches can be problematic in the noisy environment encountered in a borehole.

Second, aliases can appear in frequency coherence information. Aliases make interpretation of the frequency coherence information difficult. Time- or domain or spatial aliasing can occur when the first peak of a signal on one receiver is matched with the second peak of the signal on another receiver. This aliasing yields a false slowness value for the signal. Arrival times and the character of the frequency coherence can be used to identify peaks that are aliases for the purpose of disregarding them. However, performing the operations necessary to identify aliases complicates the analysis.

A similar problem exists in the frequency domain. Since the velocity of the aliases is dependent upon the frequency of the mode, aliases appear in the frequency coherence information as curved modes. Again, while it is possible to identify and disregard these aliases, performing the operations necessary to identify frequency domain aliases complicates the analysis.

In both the time and frequency domains, aliases cause the depth-slowness-coherence plots to appear to have extra arrivals. Depth-slowness-coherence plots collapse the time or frequency out of the plot so that the information can be plotted on a depth basis. In such plots, extra arrivals need to be identified and disregarded for an analysis of the depth-slowness-coherence plot to produce the desired results.

Finally, analyzing modes across a broad frequency spectrum is difficult. Generating a broadband signal is not feasible in some environments, and current methods for processing signals produced by a simulated broadband signal are difficult to practice successfully. Current downhole measurement systems lack the power to generate broadband signals having sufficient power at all frequencies to produce a received signal having the required amplitude without quickly depleting the power source in the downhole measurement system. Combining received signals from multiple transmitter firings at near simultaneous times (so that there is minimal tool motion between firings) is difficult in the time domain. For example, in some downhole measurement systems, a signal having a center frequency of about five kilohertz is generated and a signal having a center frequency of about twelve kilohertz is generated less than about 100 milliseconds later. The data sets generated by these signals are currently processed separately. Attempts to combine these data sets to simulate a broadband signal in the time domain using time-slowness-coherence methods have not been entirely successful.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a method 100 can be located in FIG. 1. However, reference numbers are the same for those elements that are the same across different Figures. In the drawings.

DETAILED DESCRIPTION

Figure 1:
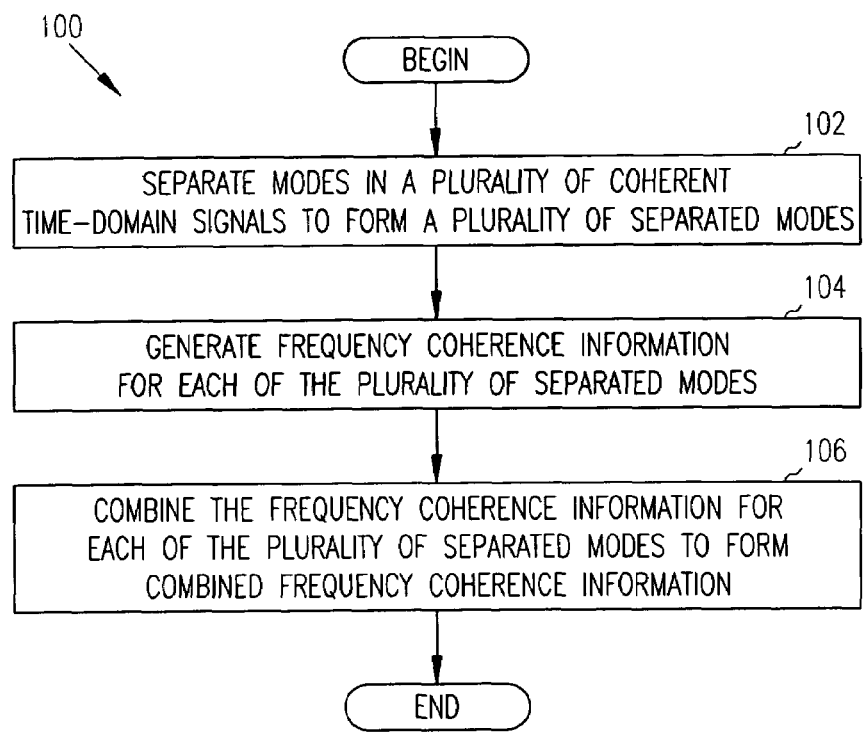
FIG. 1 is a flow diagram of a method for processing multi-mode signals, according to some embodiments of the invention.

FIG. 1 is a flow diagram of a method for processing multi-mode signals, according to some embodiments of the invention. The method 100 includes separating modes in a plurality of coherent time-domain signals to form a plurality of separated modes (block 102), generating frequency coherence information for each of the plurality of separated modes (block 104), and combining the frequency coherence information for each of the plurality of separated modes to form combined frequency coherence information (106). For more information on generating frequency (domain) coherence information, including the production of what is sometimes known as a "frequency semblance" to those of ordinary skill in the art, please refer to U.S. Pat. No. 6,691,036, assigned to the assignee of the disclosed subject matter. For more information on generating time (domain) coherence information, please see Kimball et al. "Semblance Processing of Borehole Acoustic Array Data", *Geophysics*, vol. 49, no. 3, March 1984, pp. 274-281.

Figure 2:
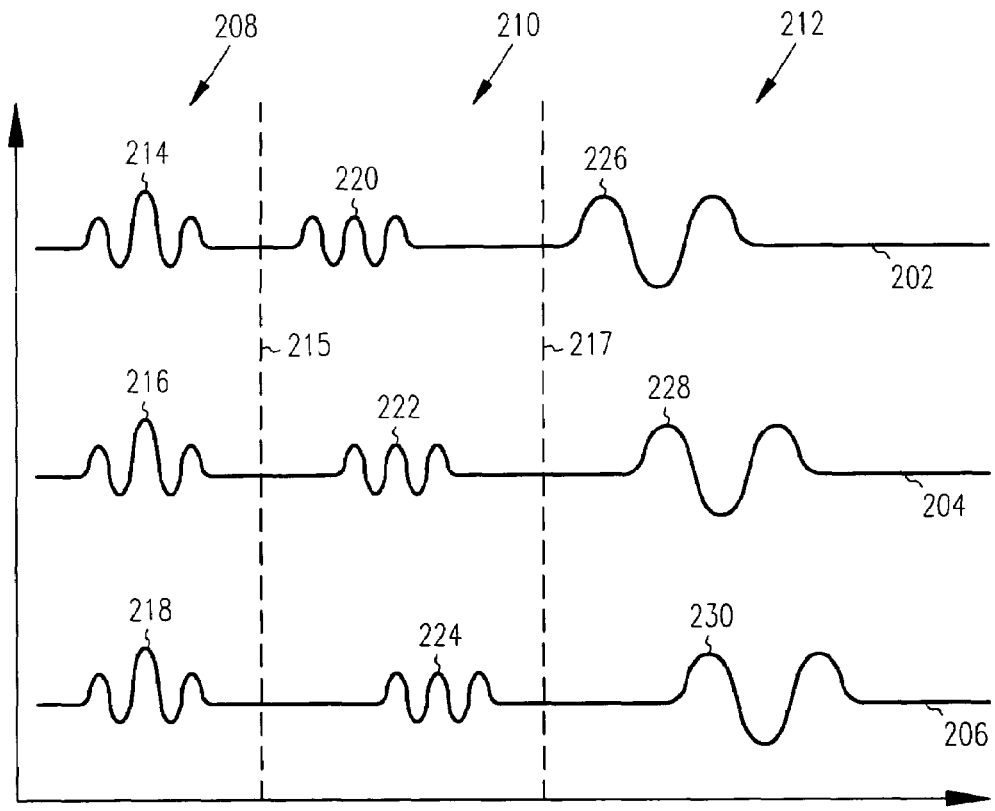
FIG. 2 is an illustration of coherent time-domain signals suitable for use in illustrating the operation of the method shown in FIG. 1, according to some embodiments of the invention.
Figure 13:
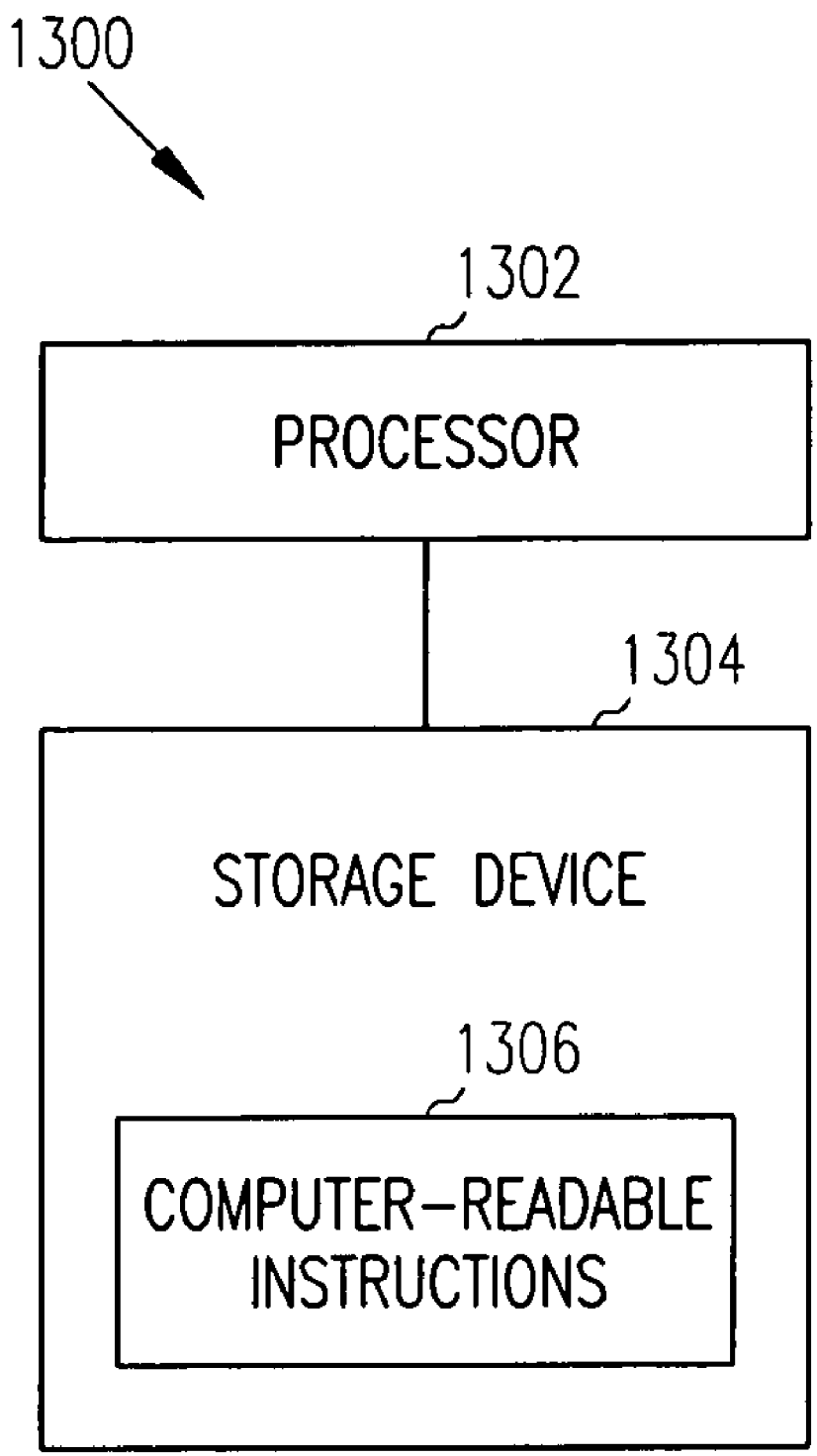
FIG. 13 is a block diagram of an apparatus according to some embodiments of the invention.

FIG. 2 is an illustration of coherent time-domain signals 202, 204, and 206 suitable for use in illustrating the operation of the method 100 shown in FIG. 1, according to some embodiments of the invention. The coherent time-domain signals 202, 204, and 206 are exemplary signals only, so the method 100 is not limited to use in connections with three signals. Any two or more (a plurality of) coherent time-domain signals can be used in connection with the method 100. Those skilled in the art will appreciate that the coherent time-domain signals 202, 204, and 206 can be generated from signals, such as acoustic signals, received at each of three receivers (not shown), respectively, in a downhole measurement system included in a system for drilling operations, as shown in FIG. 13.

The coherent time-domain signals 202, 204, and 206 include three modes 208, 210, and 212. As shown in FIG. 2, the modes 208 and 210 are separated by a dashed line 215. The modes 210 and 212 are separated by a dashed line 217. Each of the three modes 208, 210, and 212 includes three peaks. The mode 208 includes the peaks 214, 216, and 218. The mode 210 includes the peaks 220, 222, and 224. The mode 212 includes the peaks 226, 228, and 230. Thus, for each of the modes 208, 210, and 212, one peak is included from each of the coherent time-domain signals 202, 204, and 206.

Figure 3:
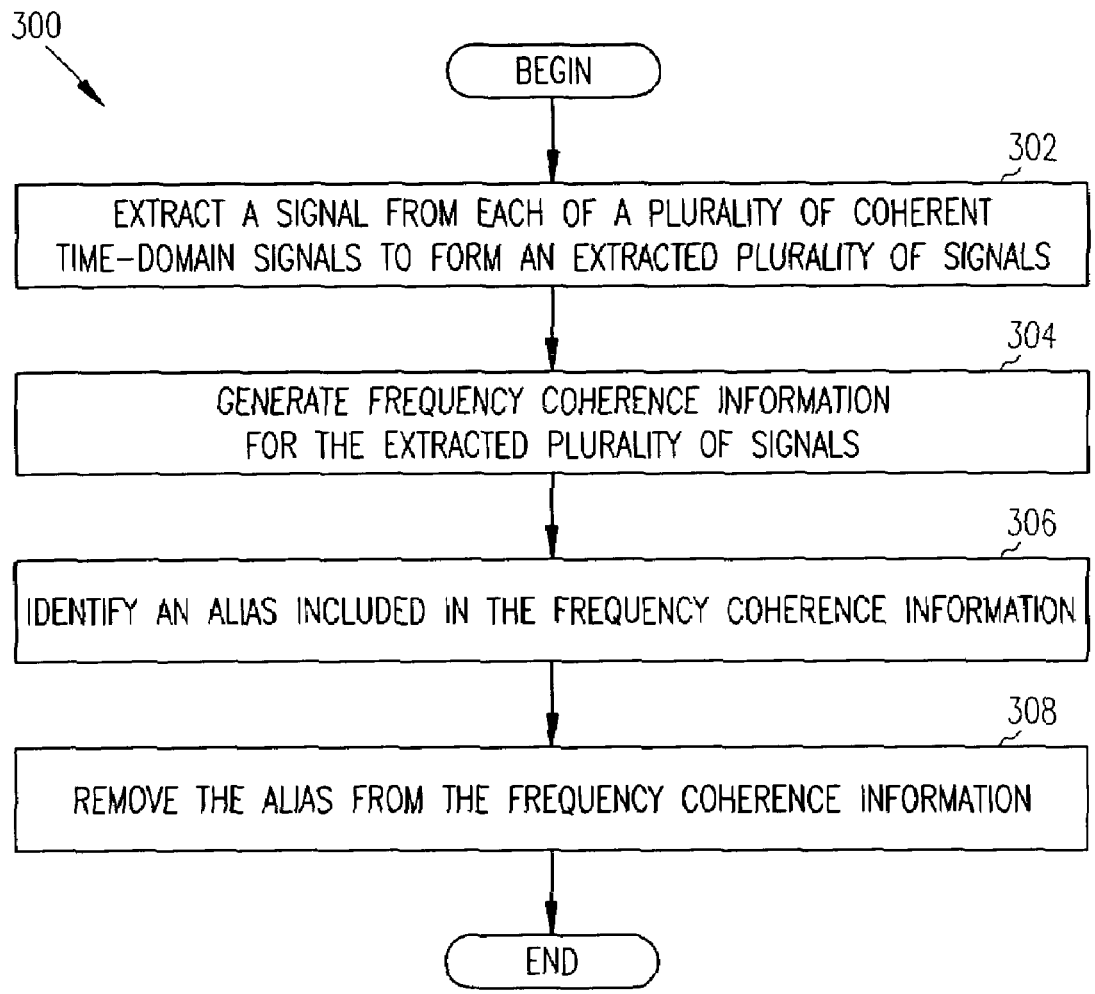
FIG. 3 is a flow diagram of a method suitable for use in the analysis of coherent time-domain signals, according to some embodiments of the invention.

FIG. 3 is a flow diagram of a method 300 suitable for use in the analysis of coherent time-domain signals, according to some embodiments of the invention. The method 300 includes extracting a signal from each of a plurality of coherent time-domain signals to form an extracted plurality of signals (block 302), generating frequency coherence information for the extracted plurality of signals (block 304), identifying a location of an alias included in the frequency coherence information (block 306), and removing the alias from the frequency coherence information (block 308).

Figure 4:
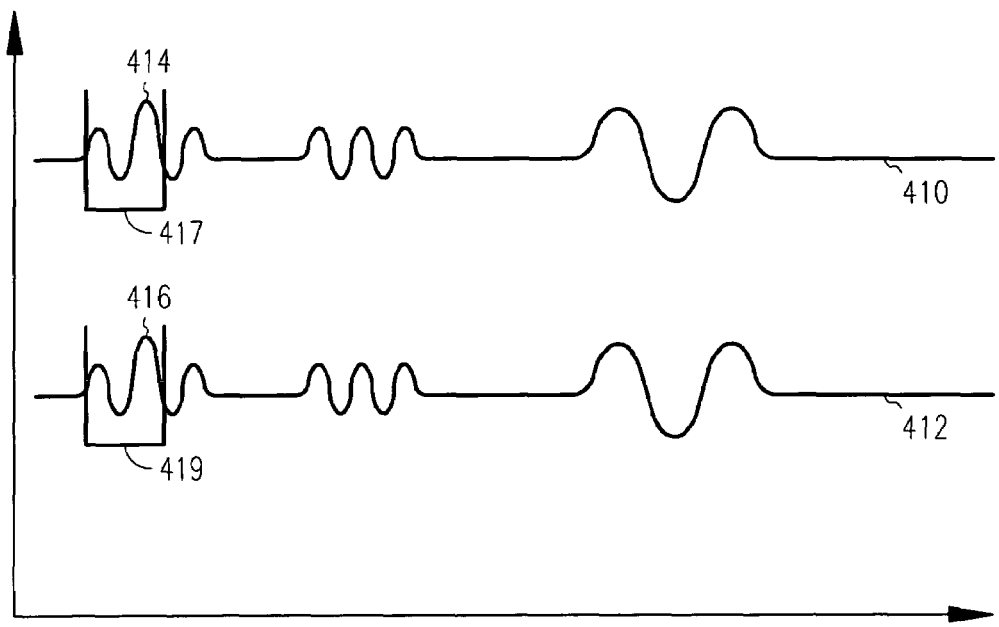
FIG. 4 is an illustration of coherent time-domain signals suitable for use in illustrating the operation of the method shown in FIG. 3, according to some embodiments of the invention.

FIG. 4 is an illustration of coherent time-domain signals 410 and 412 suitable for use in illustrating the operation of the method 300 shown in FIG. 3, according to some embodiments of the invention. In some embodiments, extracting a plurality of coherent time-domain signals to form an extracted plurality of signals includes identifying peaks in the coherent time-domain signals and extracting a signal from each of the coherent time-domain signals to form the extracted plurality of signals. For example, in FIG. 4 the coherent time-domain signals 410 and 412 include peaks 414 and 416, respectively. The extracted plurality of signals is formed by extracting signals from the plurality of coherent time-domain signals 410 and 412 near the peaks 414 and 416.

To determine the portion of the signals to be extracted from the time-domain signals 410 and 412, including the peaks 414 and 416, respectively, time windows may be used. Thus windows 417 and 419 may be constructed to include the peaks 414 and 416, respectively. The start/stop time boundaries of the windows 417 and 419 may be established manually, by a human operator, or automatically, via computer algorithm, among other methods. Factors which may be considered when defining the location and length of the windows 417 and 419 in time may include one or more of: the transmitted signal frequency, transmitted signal pulse width, the surrounding formation composition and resonance frequencies, the borehole size, the degree to which the coupling medium (e.g., mud) attenuates the transmitted signal, and the modes received. The width of the windows 417 and 419 may also be selected to minimize the number and type of of aliased signals that may appear during the execution of various methods disclosed herein. Additional filtering may be applied to the windowed signal segments, including the peaks 414 and 416, so as to reduce frequency domain ringing that may arise from discontinuities present at the end-points of isolated modal signals.

Figure 5:
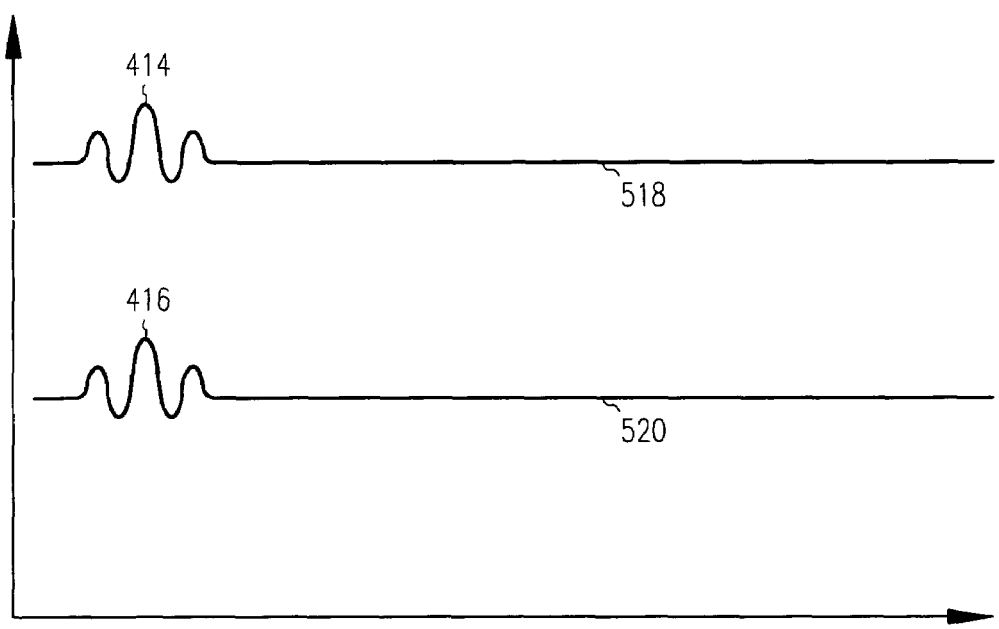
FIG. 5 is an illustration of signals, including peaks, extracted from each of the coherent time-domain signals shown in FIG. 4, according to some embodiments of the invention.

FIG. 5 is an illustration of signals 518 and 520, including peaks 414 and 416, extracted from each of the coherent time-domain signals 410 and 412, shown in FIG. 4, according to some embodiments of the invention. Frequency coherence information is generated from the extracted plurality of signals 518 and 520, in some embodiments, as described above with respect to the method 100 shown in FIG. 1.

Referring again to FIG. 3, identifying a location of an alias included in the frequency coherence information (block 306), in some embodiments, includes identifying the location of the alias in the time-domain. For example, if the velocity of a source signal is known, the arrival time of the source signal at a receiver can be calculated.

Signals arriving at substantially a multiple of the travel time for a particular source signal may be considered to be "aliases." After identifying the location of an alias in the time-domain, the alias can be removed in the frequency coherence information in the frequency domain. For example, in some embodiments, removing the alias from the frequency coherence information includes subtracting the alias from the frequency coherence information. Further, in some embodiments, extracting a signal from each of a plurality of coherent time-domain signals to form an extracted plurality of signals (block 302), includes identifying peaks in a coherent time-domain acoustic signal, and extracting the signal from each of the coherent time-domain acoustic signal to form the extracted plurality of signals.

Figure 6A:
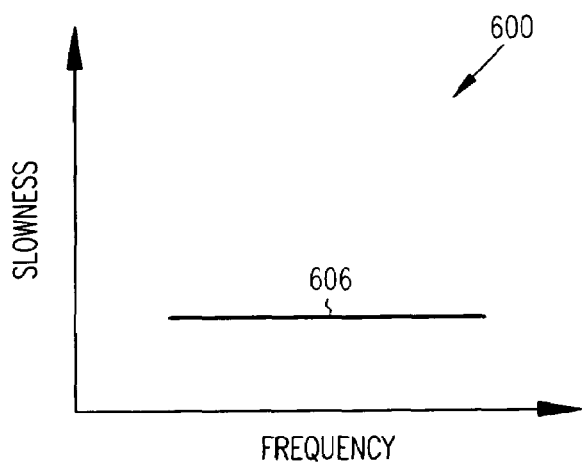
FIG. 6A, FIG. 6B, and FIG. 6C are illustrations of frequency coherence plots that are obtained from the coherent time-domain signals, shown in FIG. 2, and are suitable for use in illustrating the operation of the method shown in FIG. 1, according to some embodiments of the invention.
Figure 6B:
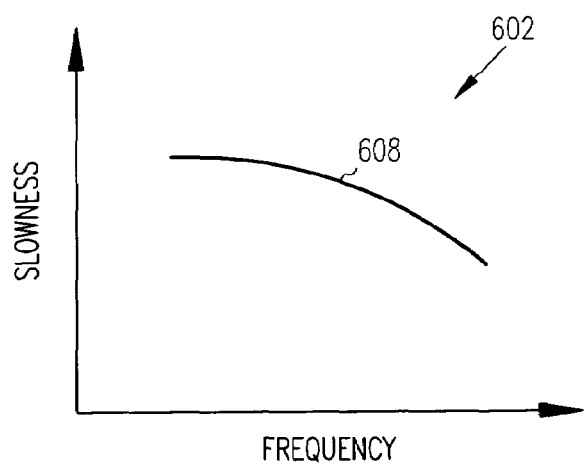
Figure 6C:
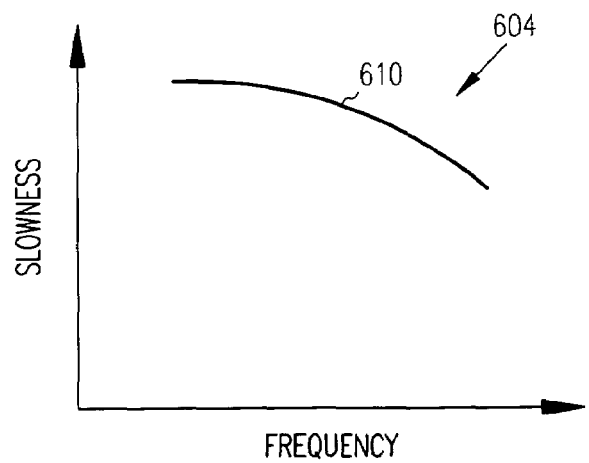

FIG. 6A, FIG. 6B, and FIG. 6C are illustrations of frequency coherence plots 600, 602, and 604 that are obtained from the coherent time-domain signals 202, 204, and 206, shown in FIG. 2, and are suitable for use in illustrating the operation of the method 100 shown in FIG. 1, according to some embodiments of the invention. The frequency coherence plots 600, 602, and 604 show frequency coherence information 606, 608, and 610 related to the coherent time-domain signals 202, 204, and 206 shown in FIG. 2. The frequency coherence information 606, 608, and 610 corresponds to the modes 208, 210, and 212, shown in FIG. 2, of the coherent time-domain signals 202, 204, and 206. Thus, the frequency coherence information 606 may correspond to the mode 208, the frequency coherence information 608 may correspond to the mode 210, and the frequency coherence information 610 corresponds to the mode 212.

The frequency coherence information 606, 608, and 610 displayed in the frequency coherence plots 600, 602 and 604 can be obtained from the coherent time-domain signals 202, 204, and 206. For example, in some embodiments, the frequency coherence information 606 may be taken as the ratio of the coherent energy of the mode 208 to the total energy of the mode 208, the frequency coherence information 608 may be taken as the ratio of the coherent energy of the mode 210 to the total energy of the mode 210, and the frequency coherence information 610 may be taken as the ratio of the coherent energy of the mode 212 to the total energy of the mode 212.

Figure 7:
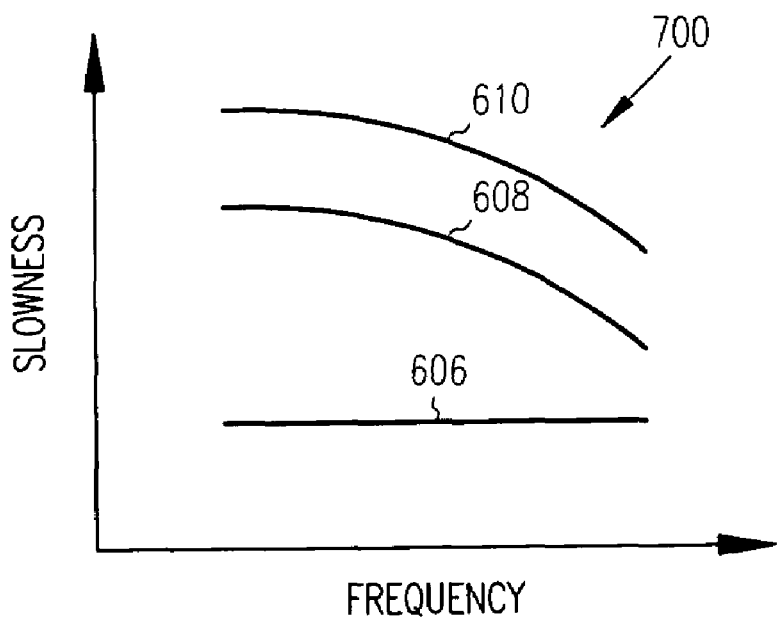
FIG. 7 is an illustration of a combined frequency coherence plot that is obtained from the frequency coherence plots, shown in FIG. 6A, FIG. 6B, and FIG. 6C, and is suitable for use in illustrating the operation of the method shown in FIG. 1, according to some embodiments of the invention.

FIG. 7 is an illustration of a combined frequency coherence plot 700 that is obtained from the frequency coherence plots 602, 604, and 606, shown in FIGS. 6A-6C, and is suitable for use in illustrating the operation of the method 100 shown in FIG. 1, according to some embodiments of the invention. The combined frequency coherence plot 700 may be formed by combining the frequency coherence information 606, 608, and 610, shown in FIGS. 6A-6C, from each of the frequency coherence plots 600, 602, and 604 into the combined frequency coherence plot 700.

In some embodiments, the frequency coherence information 606, 608, and 610 may be stored in data structures, such as matrices. For these embodiments, the combined frequency coherence information shown in the combined frequency coherence plot 700 may be formed by combining the data structures. For example, if the frequency coherence information 606 is stored in a first matrix, the frequency information 608 may be stored in a second matrix, and the frequency coherence information 610 may be stored in a third matrix. The three matrices can be combined and displayed as in the combined frequency coherence plot 700. In some embodiments, the three matrices may be combined by addition to create a single matrix that includes the frequency coherence information 606, 608, and 610 for the modes 208, 210, and 212, shown in FIG. 2, even when the modes overlap in frequency.

Although the aforementioned example includes three matrices, those skilled in the art will appreciate that the method 100, shown in FIG. 1, is suitable for use in connection with two or more (a plurality of) matrices. Those of skill in the art will also realize that one of the advantages presented by implementing the methods disclosed herein resides in the potential for reducing the number of matrix cross-terms that may be present when complete signals are used. Thus, separating modes, determining frequency coherence for each mode, and re-combining the modes can provide a much sharper matrix than simply finding the frequency coherence for signals when all modes are present.

Referring again to FIG. 2, in some embodiments, separating the modes 208, 210, and 212 in the coherent time-domain signals 202, 204, and 206 to form separated modes may include identifying the coherent peaks in each of the coherent time-domain signals 202, 204, and 206. For example, in the coherent time-domain signals 202, 204, and 206 the coherent peaks 214, 216, and 218 can be identified, the coherent peaks 220, 222, and 224 can be identified, and the coherent peaks 226, 228, and 230 can be identified. One separated mode may comprise a portion of each of the coherent time-domain signals 202, 204, and 206 that include the peaks 214, 216, and 218. A second separated mode may comprise a portion of each of the coherent time-domain signals 202, 204, and 206 that include the peaks 220, 222, and 224. A third separated mode may comprise a portion of each of the coherent time-domain signals 202, 204, and 206 that includes the peaks 226, 228, and 230. In some embodiments, after identifying the coherent peaks, such as the peaks 214, 216, and 218 of a particular mode (e.g., for mode 208), a portion of each of the coherent time-domain signals that includes the coherent peaks may be extracted.

Figure 8:
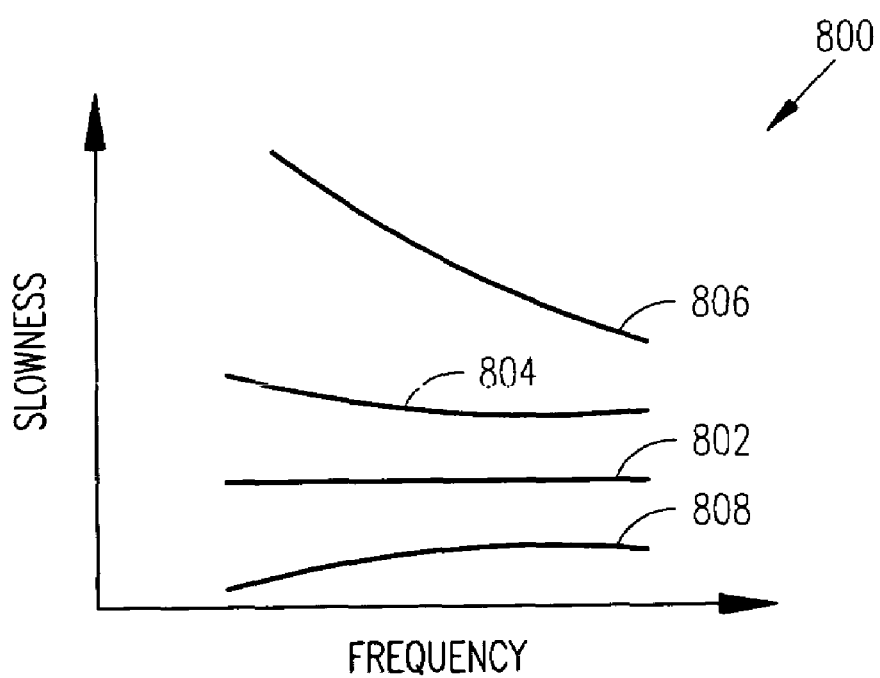
FIG. 8 is an illustration of a frequency coherence plot that includes aliases, according to some embodiments of the invention.

FIG. 8 is an illustration of a frequency coherence plot 500 that includes a true arrival signal 802 and aliases 804, 806, and 808 according to some embodiments of the invention. The appearance of one or more aliases 804, 806, and 808 in a frequency coherence plot 800 can complicate the analysis of the frequency coherence plot 800. In some embodiments, processing frequency coherence plots that include aliases includes removing the aliases from the frequency coherence information. Thus, in some embodiments, aliases are removed by identifying the location of the alias included in the frequency coherence information. In some embodiments, identifying a location of an alias (e.g., alias 804) included in the frequency coherence information (e.g., plot 800) includes first identifying the location of the alias in the time-domain. For example, if the start time and the velocity of a source signal are known, the arrival time of the source signal at a selected receiver can be calculated.

As noted previously, signals arriving at substantially a multiple of the travel time for a particular source signal may be aliases. After identifying the location of an alias in the time-domain, the alias can be removed in the frequency domain. For example, in some embodiments, to remove the alias (e.g., alias 806) from the frequency coherence information (e.g., plot 800), the alias is subtracted from the frequency coherence information.

Figure 9:
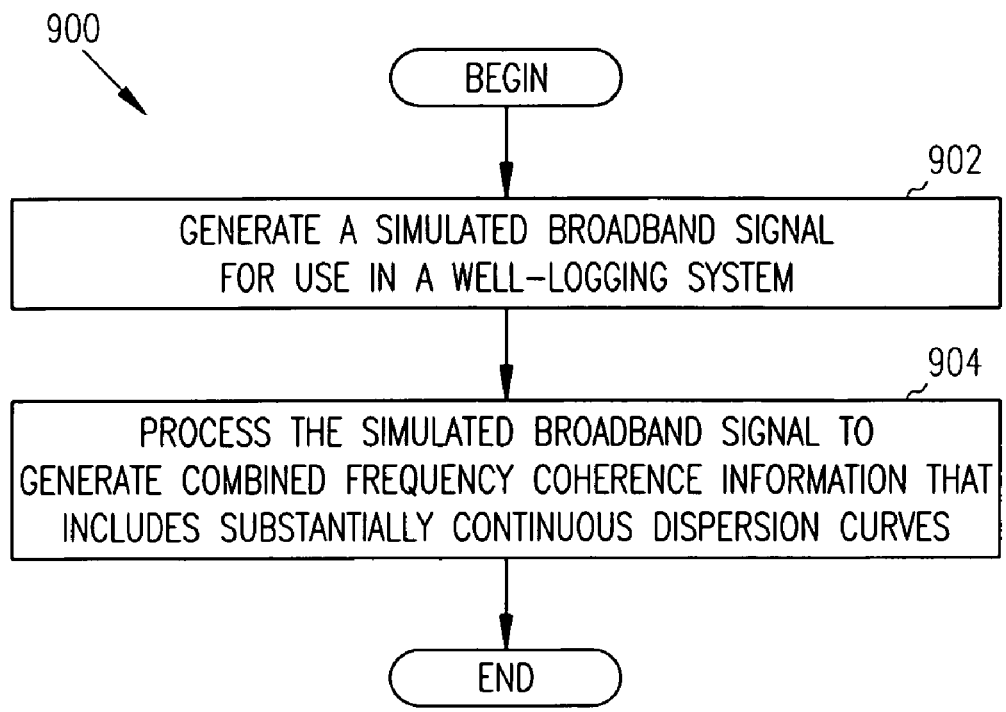
FIG. 9 is a flow diagram of a method for simulating and processing a simulated broadband signal, according to some embodiments of the invention.

FIG. 9 is a flow diagram of a method 900 for simulating and processing a simulated broadband signal, according to some embodiments of the invention. The method 900 includes generating a simulated broadband signal for use in a system, such as a well-logging system (block 902), and processing the simulated broadband signal to generate combined frequency coherence information that includes substantially continuous dispersion curves (block 904).

Figure 10:
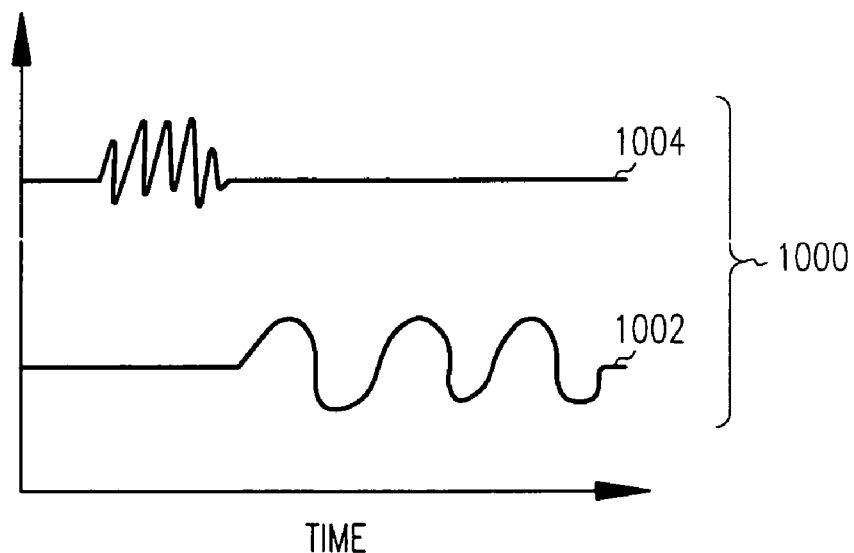
FIG. 10 is an illustration of a simulated broadband signal suitable for use in illustrating the operation of the method shown in FIG. 9, according to some embodiments of the invention.

FIG. 10 is an illustration of a simulated broadband signal 1000 suitable for use in illustrating the operation of the method 900 shown in FIG. 9, according to some embodiments of the invention. The simulated broadband signal 1000 includes two or more signals. For example, in some embodiments, such as the embodiment shown in FIG. 10, the simulated broadband signal 1000 includes a first signal 1002 and a second signal 1004. The first signal 1002 may be substantially centered at a first frequency (e.g., about 5 kHz). The second signal 1004 may be substantially centered at the second frequency (e.g., about 10 kHz). In well logging applications, the first signal 1002 and the second signal 1004 may include, but are not limited to, sonic frequencies.

Sonic frequencies may be defined as frequencies between about 20 hertz and about twenty kilohertz. As shown in FIG. 10, the first signal 1002 may have a frequency of about five kilohertz and the second signal 1004 may have a frequency of about ten kilohertz. To simulate the broadband signal 1000, the second signal 1004 may be generated after the first signal 1002. For example, in some embodiments, the second signal 1004 is generated about 100 milliseconds after the first signal 1002. Those skilled in the art will appreciate that the simulated broadband signal 1000 is not limited to simulation by the generation of two signals. Any two or more (a plurality of) signals can be generated to provide the simulated broadband signal 1000.

Figure 11A:
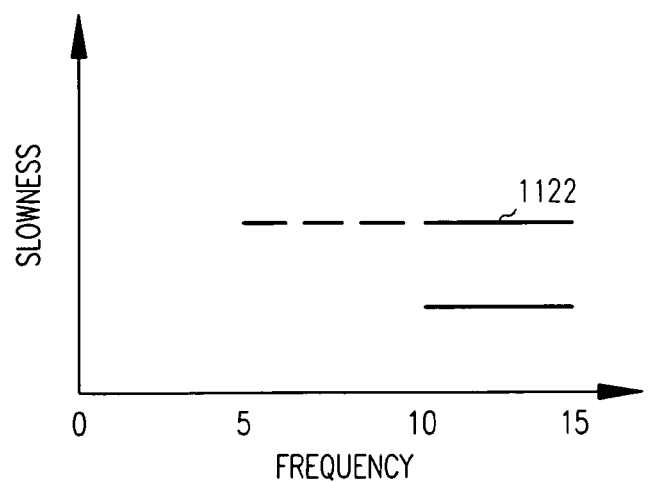
FIGS. 11A, 11B, and 11C are graphs illustrating the use of processing the simulated broadband signal shown in FIG. 10 using the method shown in FIG. 1, according to some embodiments of the invention.
Figure 11B:
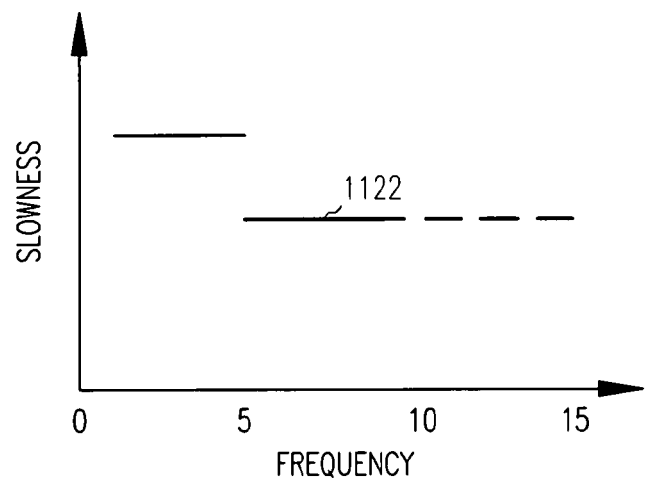
Figure 11C:
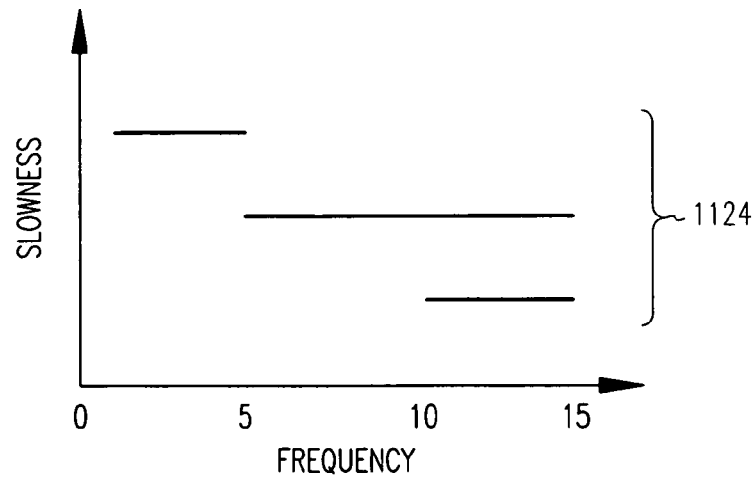

FIGS. 11A, 11B, and 11C are graphs illustrating the processing of the simulated broadband signal 1000 shown in FIG. 10 using the method 100 shown in FIG. 1, according to some embodiments of the invention. In FIGS. 11A and 11B, for example, it can be seen that at least one of the dispersion curves 1122 is discontinuous, perhaps due to masking caused by a combination of modes in a geologic formation traversed by the simulated broadband signal 1000. For example, the masking tendency of a high-frequency firing is shown in FIG. 11A, and the masking tendency of a low-frequency firing is shown in FIG. 11B. Processing the simulated broadband signal 1000 to produce the substantially continuous dispersion curves 1124 in the frequency coherence domain, as shown in FIG. 11C is desirable, in particular, because there are substantially no discontinuities in the substantially continuous dispersion curves 1124, and the substantially continuous dispersion curves 1124 are more easily analyzed than dispersion curves that include discontinuities (e.g., curve 1122). In some embodiments, the substantially continuous dispersion curves 1124 are generated from the simulated broadband signal 1000 after the simulated broadband signal 1000 passes through a geological formation (not shown) by separating the modes of the received simulated broadband signal 1000 and then recombining the modes in the frequency coherence domain.

In some embodiments, the method 100, shown in FIG. 1, is used to separate and recombine the modes of the received simulated broadband signal 1000. To the extent that dispersion curves occur in the combined frequency coherence information, this method 100 may yield dispersion curves that are substantially continuous (e.g., curve 1124).

Figure 12:
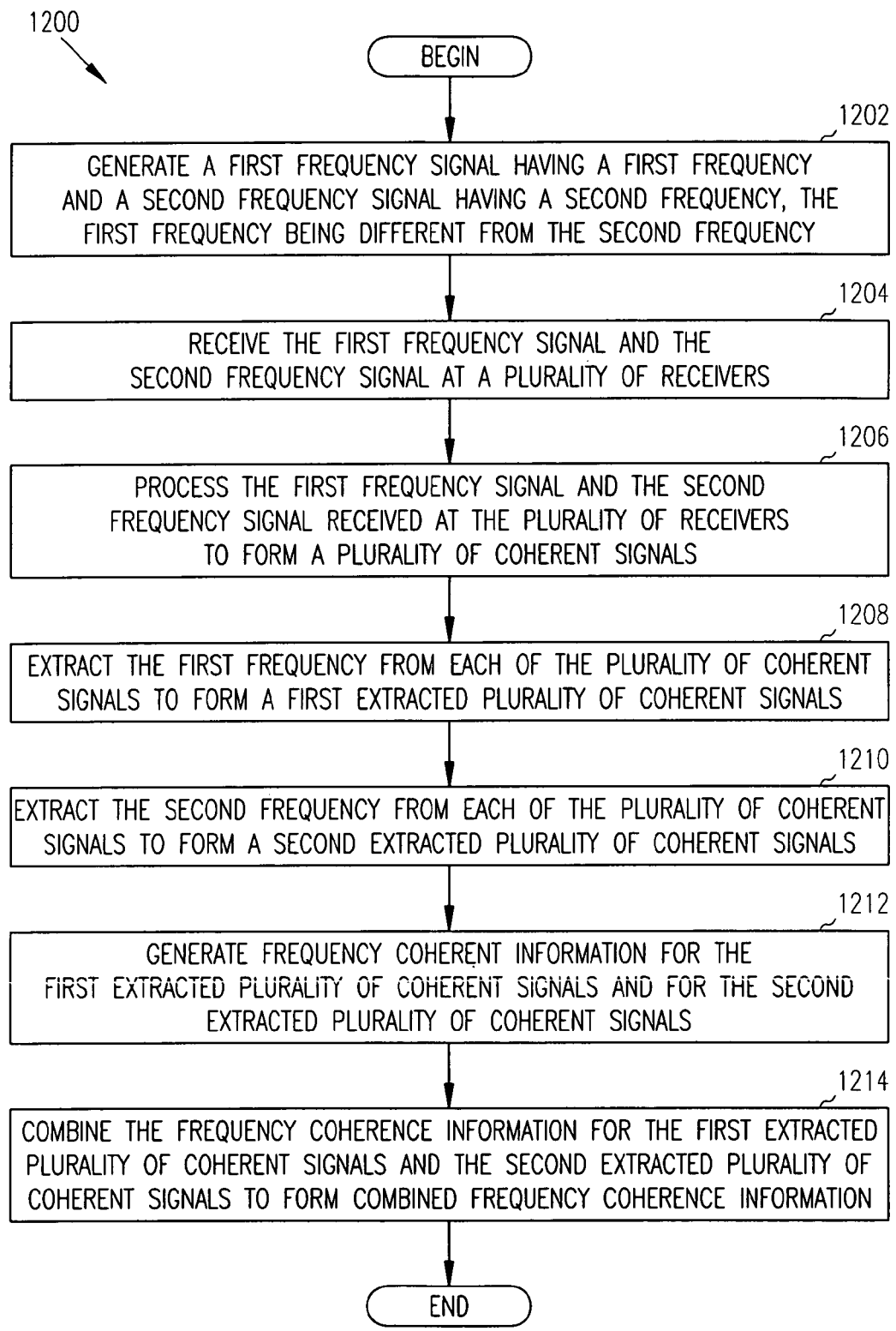
FIG. 12 is a flow diagram of a method for simulating and processing a simulated broadband signal, according to some embodiments of the invention.

FIG. 12 is a flow diagram of a method 1200 for simulating and processing a simulated broadband signal, according to some embodiments of the invention. The method 1200 includes generating a first frequency signal having a first frequency and a second frequency signal having a second frequency, the first frequency being different from the second frequency (block 1202), receiving the first frequency signal and the second frequency signal at a plurality of receivers (block 1204), and processing the first frequency signal and the second frequency signal received at the plurality of receivers to form a plurality of coherent signals (block 1206).

The method 1200 may also include extracting the first frequency signal from each of the plurality of coherent signals to form a first extracted plurality of coherent signals (block 1208), extracting the second frequency signal from each of the plurality of coherent signals to form a second extracted plurality of coherent signals (block 1210), and generating frequency coherence information for the first extracted plurality of coherent signals and for the second extracted plurality of coherent signals, (block 1212), as well as combining the frequency coherence information for the first extracted plurality of coherent signals and the second extracted plurality of coherent signals to form combined frequency coherence information (block 1214).

In some embodiments, receiving the first frequency signal and the second frequency signal at a plurality of receivers includes receiving the first frequency signal and the second frequency signal at a first receiver before receiving the first frequency signal and the second frequency signal at a second receiver. In some embodiments, the method of claim 1200 further includes analyzing dispersion in the first frequency signal or the second frequency signal. In some embodiments, the method of claim 1200 further includes identifying an alias in the combined frequency coherence information.

Those of skill in the art, after reading the methods disclosed, will understand that many other embodiments may be realized. For example, a method according to various embodiments may comprise acquiring data having multiple combined modes. The acquired data may be capable of being used to generate a graph of slowness versus time versus coherence over a plurality of depths. The method may further include transforming the data to provide frequency-dependent data, which may in turn be capable of being used to generate a graph of slowness versus frequency versus coherence over the plurality of depths. The resulting graph may operate to separate the multiple combined modes into multiple, substantially distinct, separated modes.

In some embodiments, the multiple, substantially distinct, separated modes may include at least one of a mud arrival mode, a compressional mode, a shear mode, a leaky-p mode, a flexural mode, a monopole mode, and a multipole mode. For more information regarding such multiple, substantially distinct, separated modes, please refer to Paillet et al. "A Numerical Investigation of Head Waves and Leaky Modes in Fluid-Filled Boreholes", *Geophysics*, vol. 51, no. 7, July 1986, pp. 1438-1449. Those of skill in the art will realize, after reading the methods disclosed herein, that the data may be acquired in any number of environments, including during drilling operations that make use of an LWD tool, an MWD tool, and/or a wireline tool.

It should be noted that the methods described herein do not have to be executed in the order described, or in any particular order. Moreover, various activities described with respect to the methods identified herein can be executed in serial or parallel fashion. For the purposes of this document, the terms "information" and "data" may be used interchangeably. Information, including parameters, commands, operands, and other data, can be sent and received in the form of one or more carrier waves.

FIG. 13 is a block diagram of an apparatus 1300 suitable for use in connection with some embodiments of the invention. The apparatus 1300 may include a processor 1302 and a storage device 1304. The storage device 1304 can be encoded with computer-readable instructions 1306 that can be read and executed by the processor. The processor 1302 is coupled to the storage device 1304 such that information can be exchanged between the processor 1302 and the storage device 1304.

In some embodiments, the computer-readable instructions 1306 are read and executed by the processor 1302 to initiate activities such as separating modes in a plurality of coherent time-domain signals, and recombining the modes in a frequency domain. In some embodiments, separating modes in the plurality of coherent time-domain signals includes identifying a coherent peak in each of the plurality of coherent time-domain signals, and extracting only a portion of each of the plurality of coherent time-domain signals that include the coherent peak. In some embodiments, recombining the modes in he frequency domain comprises adding frequency-domain matrices. In some embodiments, the instructions when read and executed by the process further include identifying aliases in the frequency domain, and removing the aliases.

As was described in detail above, aspects of some embodiments pertain to specific apparatus and method elements that can be implemented on a computer or other electronic device. In other embodiments, the invention may be implemented as a program product for use with an electronic device. The programs defining the functions of this embodiment may be delivered to an electronic device via a variety of signal-bearing media, which include, but are not limited to: information permanently stored on a non-rewriteable storage medium, e.g., a read-only memory device attached to or within an electronic device, such as a CD-ROM readable by a CD-ROM drive; alterable information stored on a rewriteable storage medium, e.g., a hard disk drive or diskette; or information conveyed to an electronic device by a communications medium, such as through a computer or a telephone network, including wireless communications. Such signal-bearing media, when carrying machine-readable instructions that direct the functions of various embodiments of the invention, may in themselves represent embodiments of the invention.

Figure 14:
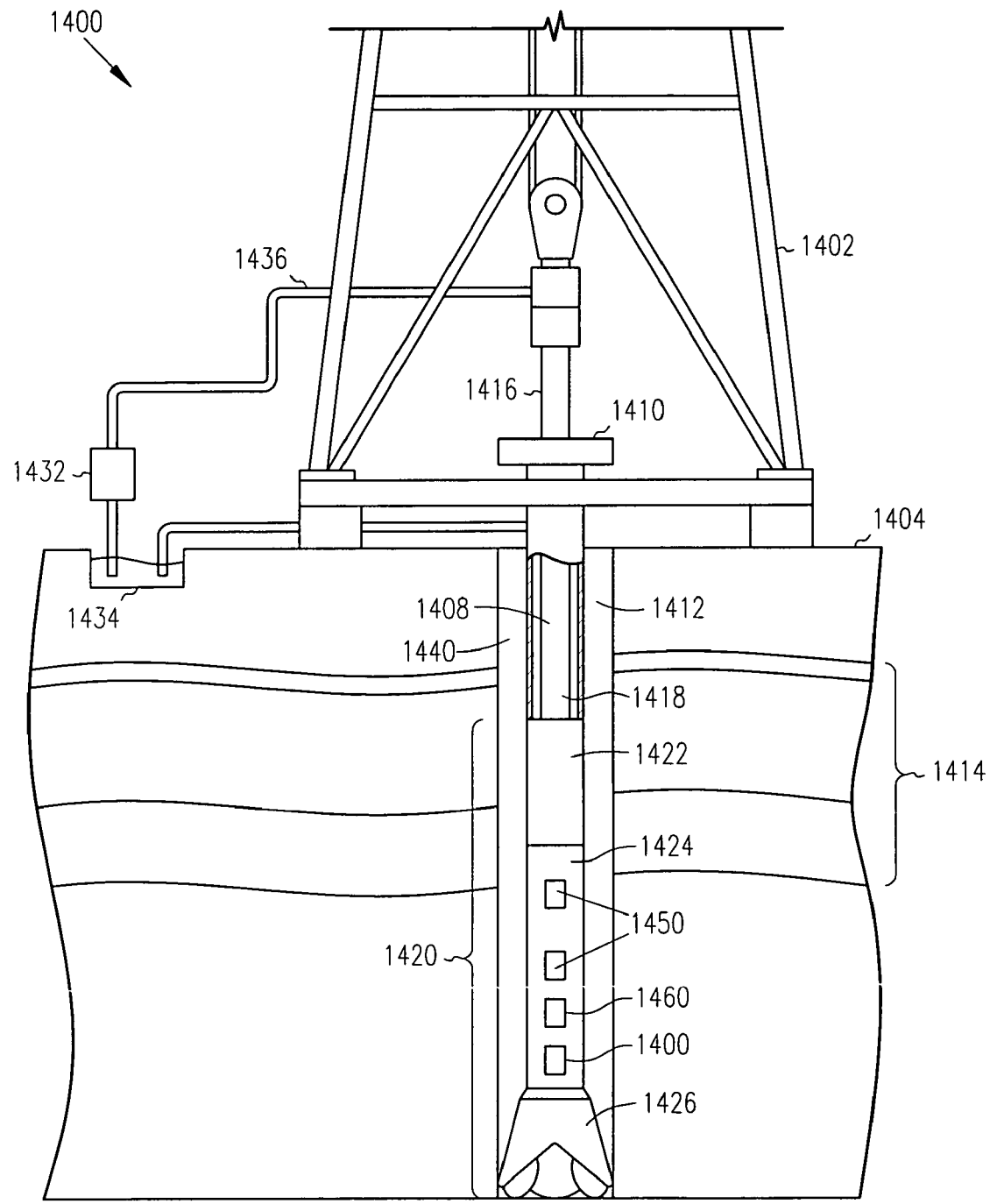
FIG. 14 illustrates a system for drilling operations according to some embodiments of the invention.

FIG. 14 illustrates a system 1400 that may be used during drilling operations, according to some embodiments of the invention. The system 1400 may include a drilling rig 1402 located at a surface 1404 of a well. The drilling rig 1402 may provide support for a drill string 1408. The drill string 1408 may penetrate a rotary table 1410 for drilling a borehole 1412 through subsurface formations 1414. The drill string 1408 may include a Kelly 1416 (e.g., in the upper portion), a drill pipe 1418, and a bottom hole assembly 1420 (perhaps located at the lower portion of the drill pipe 1418).

The bottom hole assembly 1420 may include drill collars 1422, a downhole tool 1424, and a drill bit 1426. For the purposes of this document, a "tool" may comprise a tubular metal structure that moves through a borehole, including those used in conducting measurement-while-drilling (MWD) operations, logging-while-drilling (LWD) operations, and wireline operations. Thus, the downhole tool 1424 may comprise any of a number of different types of tools including MWD tools, LWD tools, and wireline tools. The downhole tool 1424 may include apparatus 1300 (similar to or identical to the apparatus 1300 shown in FIG. 13) that can be used to execute methods for processing information, such as the information shown in FIG. 2.

During drilling operations, the drill string 1408 (including the Kelly 1416, the drill pipe 1418 and the bottom hole assembly 1420) may be rotated by the rotary table 1410. In addition or alternative to such rotation, the bottom hole assembly 1320 may also be rotated by a motor (not shown) located downhole. The drill collars 1422 may be used to add weight to the drill bit 1426. The drill collars 1422 may also operate to stiffen the bottom hole assembly 1420, permitting the bottom hole assembly 1420 to transfer the added weight to the drill bit 1426. Accordingly, this weight provided by the drill collars 1422 may also assist the drill bit 1426 in the penetration of the surface 1404 and the subsurface formations 1414.

During drilling operations, a mud pump 1432 may pump drilling fluid (sometimes known as "drilling mud" to those of skill in the art) from a mud pit 1434 through a hose 1436 into the drill pipe 1418 down to the drill bit 1426. The drilling fluid can flow out from the drill bit 1426 and return back to the surface through an annular area 1440 between the drill pipe 1418 and the sides of the borehole 1412. The drilling fluid may be returned to the mud pit 1434, where such fluid is filtered. Accordingly, the drilling fluid can cool the drill bit 1426 as well as provide lubrication for the drill bit 1426 during the drilling operation. Additionally, the drilling fluid may operate to remove subsurface formation 1414 cuttings created by the drill bit 1426.

The downhole tool 1424 may include one or more transducers 1450, including sensors, which operate to monitor different downhole parameters and generate data that can be stored within one or more different storage media, perhaps located within the downhole tool 1424 (e.g., as part of the apparatus 1300). The type of downhole tool 1424 and the type of sensors 1450 located thereon may be dependent on the type of downhole parameters being measured. Such parameters may include the downhole temperature and pressure, the various characteristics of the subsurface formations (such as resistivity, water saturation, density, porosity, etc.), the characteristics of the borehole (e.g., size, shape, etc.), sonic transducers, magnetostrictive transducers, etc.

Thus, referring now to FIGS. 13 and 14, it can be seen that in some embodiments, a system 1400 may comprise a transducer 1450 to receive a plurality of signals, wherein the plurality of signals is associated with a corresponding plurality of coherent time-domain signals including modes. The system 1400 may also include one or more apparatus 1300, such that the system 1400 may include a processor 1302 and a storage device 1304 encoded with computer-readable instructions 1306. The instructions 1306, when read and executed by the processor 1302, may comprise separating the modes in the plurality of coherent time-domain signals, and recombining the modes in a frequency domain. In some embodiments, separating the modes in the plurality of coherent time-domain signals may comprises identifying a coherent peak in each of the plurality of coherent time-domain signals, and extracting only a portion of each of the plurality of coherent time-domain signals that include the coherent peak, as noted previously. Further, the instructions 1306, when read and executed by the processor 1302, may further comprise identifying aliases in the frequency domain, and removing the aliases.

In some embodiments, the system 1400 may comprise a downhole tool 1424 having an amplifier 1460 to couple to one or more of the transducers 1450. The downhole tool may comprise any number of implements, including an LWD tool, an MWD tool, and/or a wireline tool.

Those of skill in the art will realize that even though signal processing of sonic frequencies has been discussed herein as a matter of convenience, frequencies other than sonic frequencies may also be processed according to the illustrated methods. Thus, the subject matter disclosed herein should not to be so limited. Therefore, in some embodiments, the frequencies to be processed may include a range of frequencies from about 10 hertz to about 20 megahertz. In some embodiments, the frequencies to be processed may include frequencies from about 1 kilohertz to about 20 gigahertz. In some embodiments, the frequencies processed may include optical wavelengths, as well as radio frequencies. Thus, in some embodiments, the range of frequencies processed may include about 10 hertz to about 300 gigahertz, and even up to about $4 \times 10^5$ gigahertz (frequency equivalent of light having a wavelength of about 800 nanometers). Thus, many other embodiments may be realized, such as implementing the methods, apparatus, and systems disclosed herein as part of: check-shot and vertical seismic profile (VSP) analysis, acoustic look-ahead/look-around sensors, monopole and multipole sensors (including acoustic sensors), caliper and borehole imager signal analysis (including acoustic signals), and Stonely wave analysis for pore pressure measurements. Modes may be separated with respect to waves traveling in optical fiber guides, waves used in pulsed electromagnetic sounding equipment, electroseismic signals, radar signals (including chirped signals), and various telemetry applications, including multiple-input, multiple-output (MIMO) radio communications systems.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R., §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   acquiring, in a borehole, propagating wave data to include a plurality of coherent time-domain signals;
   separating modes in the plurality of coherent time-domain signals to form a plurality of separated modes by first identifying coherent peaks in the plurality of coherent time-domain signals and second extracting portions of the plurality of time-domain signals that include the coherent peaks;
   generating frequency coherence information for each of the plurality of separated modes;
   combining the frequency coherence information for each of the plurality of separated modes to form combined frequency coherence information; and
   displaying the combined frequency coherence information.

2. The method of claim 1, wherein combining the frequency coherence information for each of the plurality of separated modes to form combined frequency coherence information comprises combining a plurality of frequency-domain matrices.

3. The method of claim 2, where combining the plurality of frequency-domain matrices comprises adding the plurality of frequency coherence matrices to create a single matrix that includes the modes, even when the modes overlap in frequency.

4. The method of claim 1, further comprising removing an alias from the frequency coherence information.

5. The method of claim 4, further comprising identifying a location of the alias included in the frequency coherence information by identifying the alias in a time domain.

6. The method of claim 5, wherein removing the alias from the frequency coherence information comprises subtracting the alias from the frequency coherence information.

7. A method comprising:
   generating a simulated broadband signal for use in a well-logging system;
   first separating modes of the simulated broadband signal by identifying coherent peaks in a plurality of coherent time-domain signals;
   second extracting portions of the plurality of coherent time-domain signals that include the coherent peaks;
   processing the portions and the simulated broadband signal to generate combined frequency coherence information that includes substantially continuous dispersion curves; and
   displaying at least the substantially continuous dispersion curves.

8. The method of claim 7, wherein generating the simulated broadband signal for use in the well-logging system comprises:
   generating at least two frequencies to form the simulated broadband signal.

9. The method of claim 8, wherein processing the simulated broadband signal to generate combined frequency coherence information that includes continuous dispersion curves comprises:
   receiving the simulated broadband signal after it passes through a geological formation;
   and recombining the modes to generate the combined frequency coherence information that includes the substantially continuous dispersion curves.

10. The method of claim 9, wherein generating at least two frequencies to form the simulated broadband signals to form the simulated broadband signal comprises generating at least two sonic frequencies.

11. An apparatus comprising:
    a processor; and
    a storage device encoded with computer-readable instructions wherein the instructions when read and executed by the processor comprise:
      separating modes to provide separated modes in a plurality of coherent time-domain signals by first identifying coherent peaks in the plurality of coherent time-domain signals and second extracting portions of the plurality of time-domain signals that include the coherent peaks;
      generating frequency coherence information for each of the separated modes; and
      recombining the separated modes in a frequency domain.

12. The apparatus of claim 11, wherein separating modes in the plurality of coherent time-domain signals comprises:
    extracting only the portions of the plurality of time-domain signals that include the coherent peaks.

13. The apparatus of claim 12, wherein recombining the modes in the frequency domain comprises adding frequency-domain matrices.

14. The apparatus of claim 11, wherein the instructions when read and executed by the processor further comprise:
    identifying aliases in the frequency domain; and
    removing the aliases.

15. A system, comprising:
    a transducer to receive a plurality of signals, wherein the plurality of signals is associated with a corresponding plurality of coherent time-domain signals including modes;
    a processor; and
    a storage device encoded with computer-readable instructions wherein the instructions when read and executed by the processor comprise:
      separating modes to provide separated modes in a plurality of coherent time-domain signals by first identifying coherent peaks in the plurality of coherent time-domain signals and second extracting portions of the plurality of time-domain signals that include the coherent peaks;

generating frequency coherence information for each of the separated modes; and recombining the separated modes in a frequency domain.

16. The system of claim 15, wherein separating the modes in the plurality of coherent time-domain signals comprises:

extracting only the portions of the plurality of time-domain signals that include the coherent peaks.

17. The system of claim 15, further comprising:

a downhole tool having an amplifier to couple to the transducer.

18. The system of claim 17, wherein the downhole tool comprises:

a logging-while-drilling tool.

19. The system of claim 17, wherein the downhole tool comprises:

a measurement-while-drilling tool.

20. The system of claim 17, wherein the downhole tool comprises:

a wireline tool.

21. The system of claim 15, wherein the instructions when read and executed by the processor further comprise:

identifying aliases in the frequency domain; and removing the aliases.

22. A method comprising:

acquiring data having multiple combined modes and capable of being used to generate a graph of slowness versus time versus coherence over a plurality of depths;

separating the multiple combined modes by first identifying coherent peaks in a plurality of coherent time-domain signals included in the data;

second extracting portions of the plurality of time-domain signals that include the coherent peaks; and transforming the data to provide frequency-dependent data capable of being used to generate a graph of slowness versus frequency versus coherence over the plurality of depths so as to separate the multiple combined modes into multiple, substantially distinct, separated modes, wherein the multiple, substantially distinct, separated modes include at least one of a mud arrival mode, a compressional mode, a shear mode, a leaky-p mode, a flexural mode, a monopole mode, and a multipole mode.

23. The method of claim 22, further comprising:

acquiring the data using a logging-while-drilling tool.

24. The method of claim 22, further comprising:

acquiring the data using a measurement-while-drilling tool.

25. The method of claim 22, further comprising:

acquiring the data using a wireline tool.

* * * * *

UNITED STATES PATENT AND TRADEMARK OFFICE
CERTIFICATE OF CORRECTION

PATENT NO. : 7,739,049 B2  Page 1 of 1
APPLICATION NO. : 10/839785
DATED : June 15, 2010
INVENTOR(S) : Jennifer Market It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1111 days.

In column 11, line 47, in Claim 3, delete "where" and insert -- wherein --, therefor.

In column 12, line 22, delete "claim 9, wherein generating at least two frequencies to form the simulated broadband signals to form the simulated broadband signal comprises generating at least two sonic frequencies." and insert -- claim 8, wherein generating at least two frequencies to form the simulated broadband signal comprises generating at least two sonic frequencies. --, therefor.

Signed and Sealed this
Twenty-second Day of March, 2011

David J. Kappos
*Director of the United States Patent and Trademark Office*